United States Patent
Ozawa

(10) Patent No.: US 6,678,783 B2
(45) Date of Patent: Jan. 13, 2004

(54) INTER-DEVICE COUPLER

(75) Inventor: Kunihiko Ozawa, Tokyo (JP)

(73) Assignee: Sony Corporation, Tokyo (JP)

( * ) Notice: Subject to any disclaimer, the term of this patent is extended or adjusted under 35 U.S.C. 154(b) by 502 days.

(21) Appl. No.: 09/727,917

(22) Filed: Dec. 1, 2000

(65) Prior Publication Data

US 2001/0005879 A1 Jun. 28, 2001

(30) Foreign Application Priority Data

Dec. 3, 1999 (JP) .......................................... 11-345382

(51) Int. Cl.[7] .............................................. G06F 13/00
(52) U.S. Cl. ...................................... 710/316; 713/401
(58) Field of Search ........................ 711/167; 710/100, 710/316, 317, 107, 305; 713/401; 712/220, 221

(56) References Cited

U.S. PATENT DOCUMENTS 4,725,970 A * 2/1988 Burrows et al. ............... 703/14
4,939,684 A * 7/1990 Gehrig et al. ................ 708/303
5,253,357 A * 10/1993 Allen et al. .................. 711/115

* cited by examiner

Primary Examiner—Glenn A. Auve
(74) Attorney, Agent, or Firm—Frommer Lawrence & Haug LLP; William S. Frommer

(57) ABSTRACT

An inter-device coupler, capable of giving any delay to output data of an ALU and outputting the result as input data of the ALU with a simple configuration and without increasing the power consumption, providing a path selector for setting a path for generating various delays in accordance with the value of a selection signal between the outputs of flip-flops on the input side of the coupler and the input of a flip-flop on the output side, whereby it becomes possible to generate any of those delays from output of data by the ALU to input of the data to the ALU.

16 Claims, 9 Drawing Sheets

FIG.2A CK1
(RELATED ART)
FIG.2B CK2
(RELATED ART)
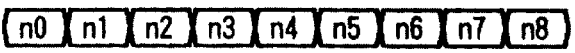
FIG.2C ALUOT
(RELATED ART)
FIG.2D OTD0
(RELATED ART)
FIG.2E OTD1
(RELATED ART)
FIG.2F OT0
(RELATED ART)
FIG.2G OT1
(RELATED ART)
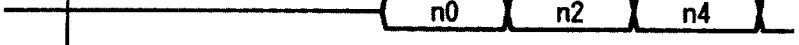
FIG.2H IN0
(RELATED ART)
FIG.2I IN1
(RELATED ART)
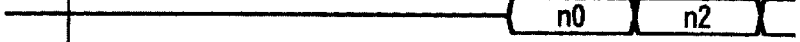
FIG.2J IND0
(RELATED ART)
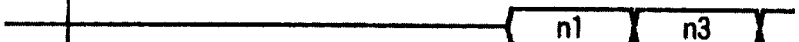
FIG.2K IND1
(RELATED ART)
FIG.2L IND2
(RELATED ART)
FIG.2M OSEL
(RELATED ART)
FIG.2N ALUIN
(RELATED ART)
|←— 7 STAGES —→|

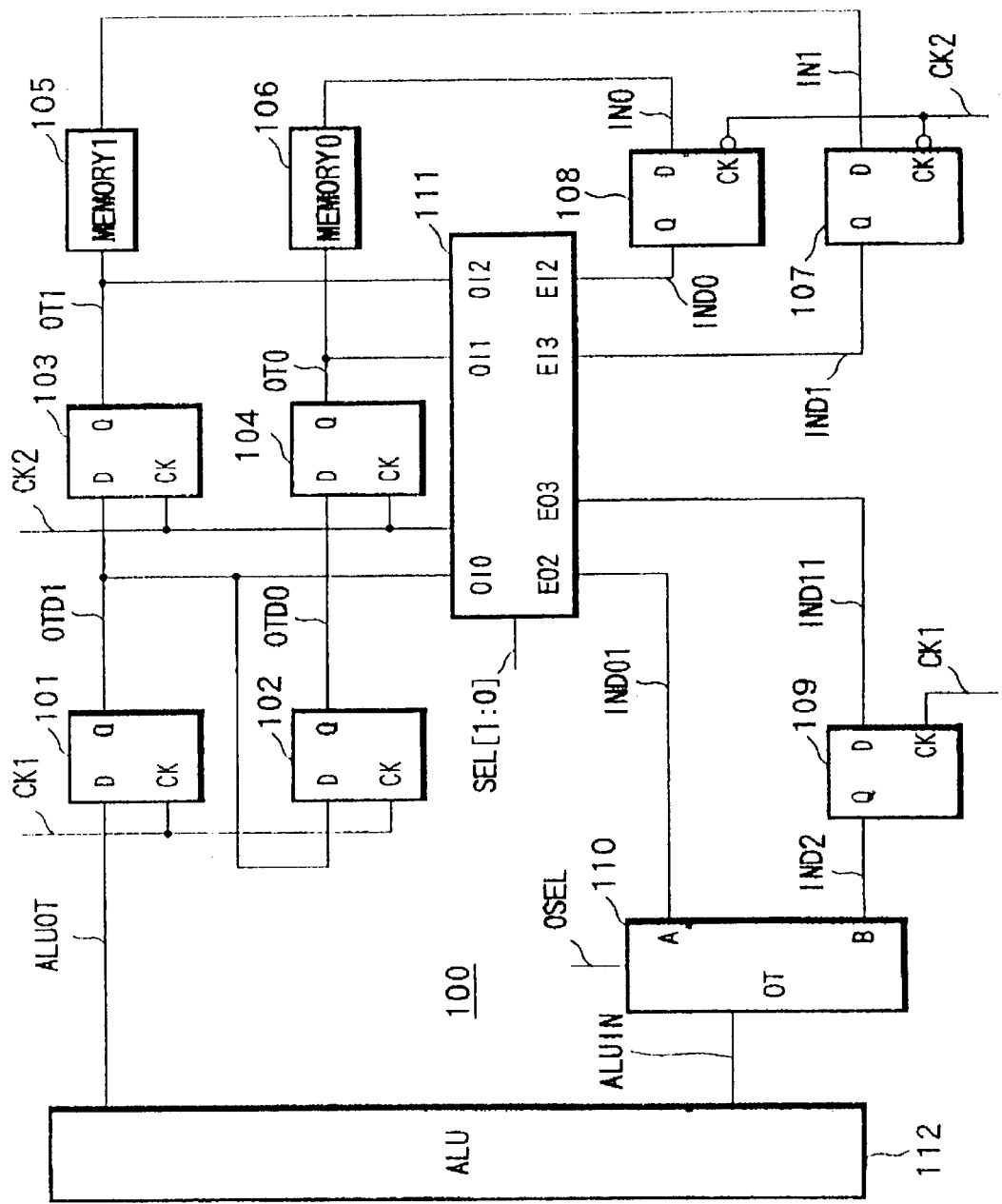

| SEL[1:0] | EO2 | EO3 |
|---|---|---|
| 00 | EI2 | EI3 |
| 01 | OI1 | OI2 |
| 10 | OI1 | OI2 |
| 11 | OI0 | OI0 |

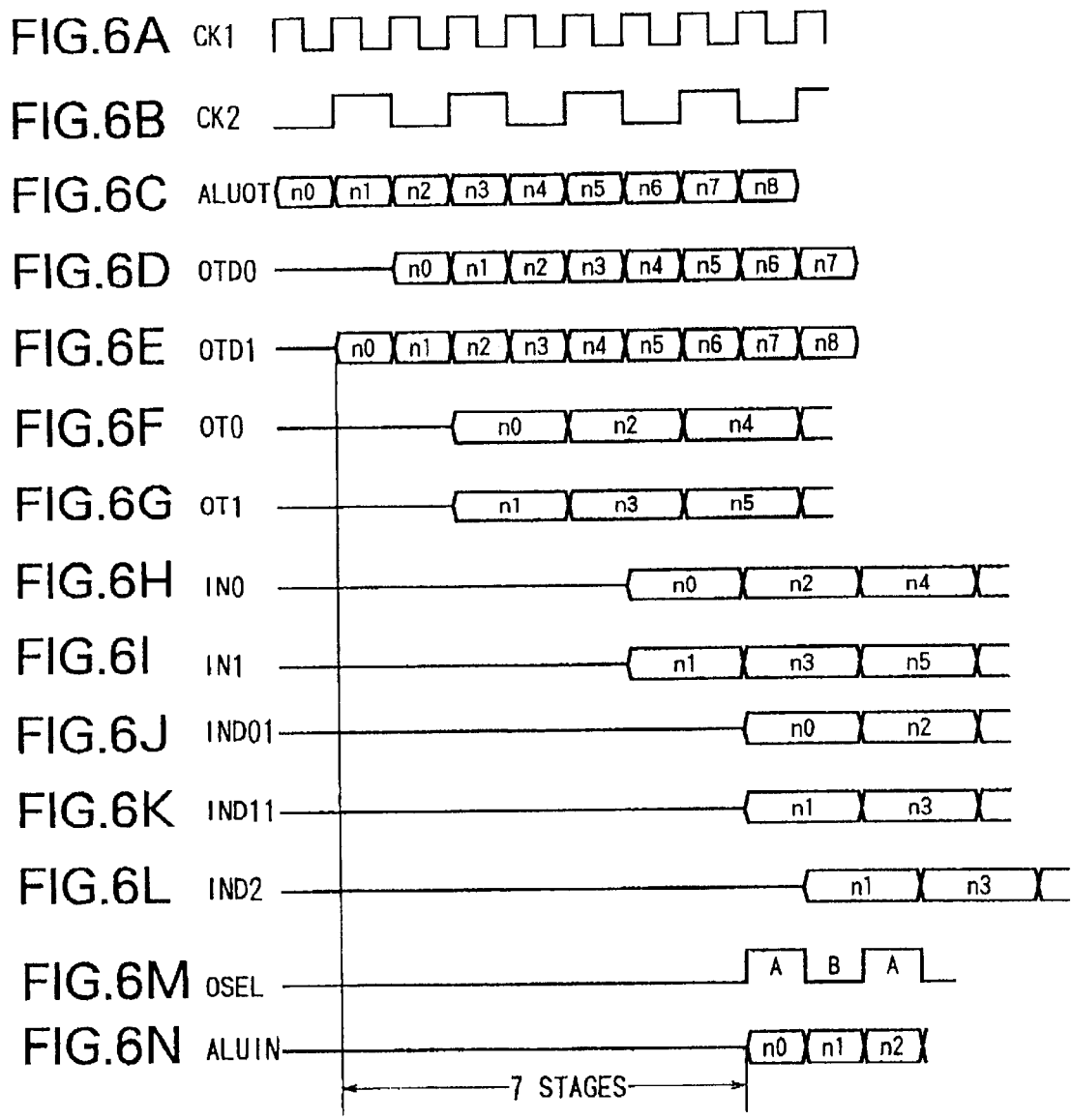

FIG. 7A CK1 
FIG. 7B CK2 
FIG. 7C ALUOT 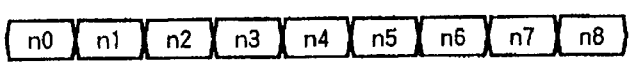
FIG. 7D OTD0 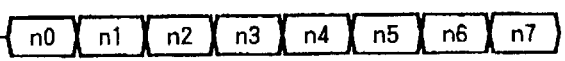
FIG. 7E OTD1 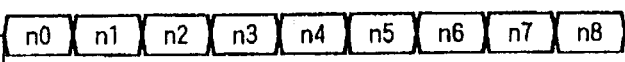
FIG. 7F OT0 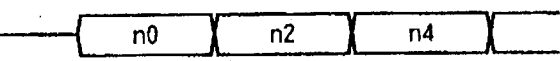
FIG. 7G OT1 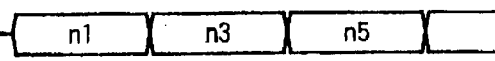
FIG. 7H IND01 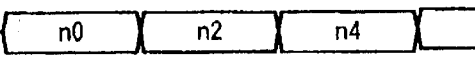
FIG. 7I IND11 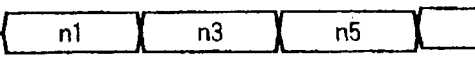
FIG. 7J IND2 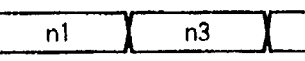
FIG. 7K OSEL 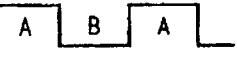
FIG. 7L ALUIN 

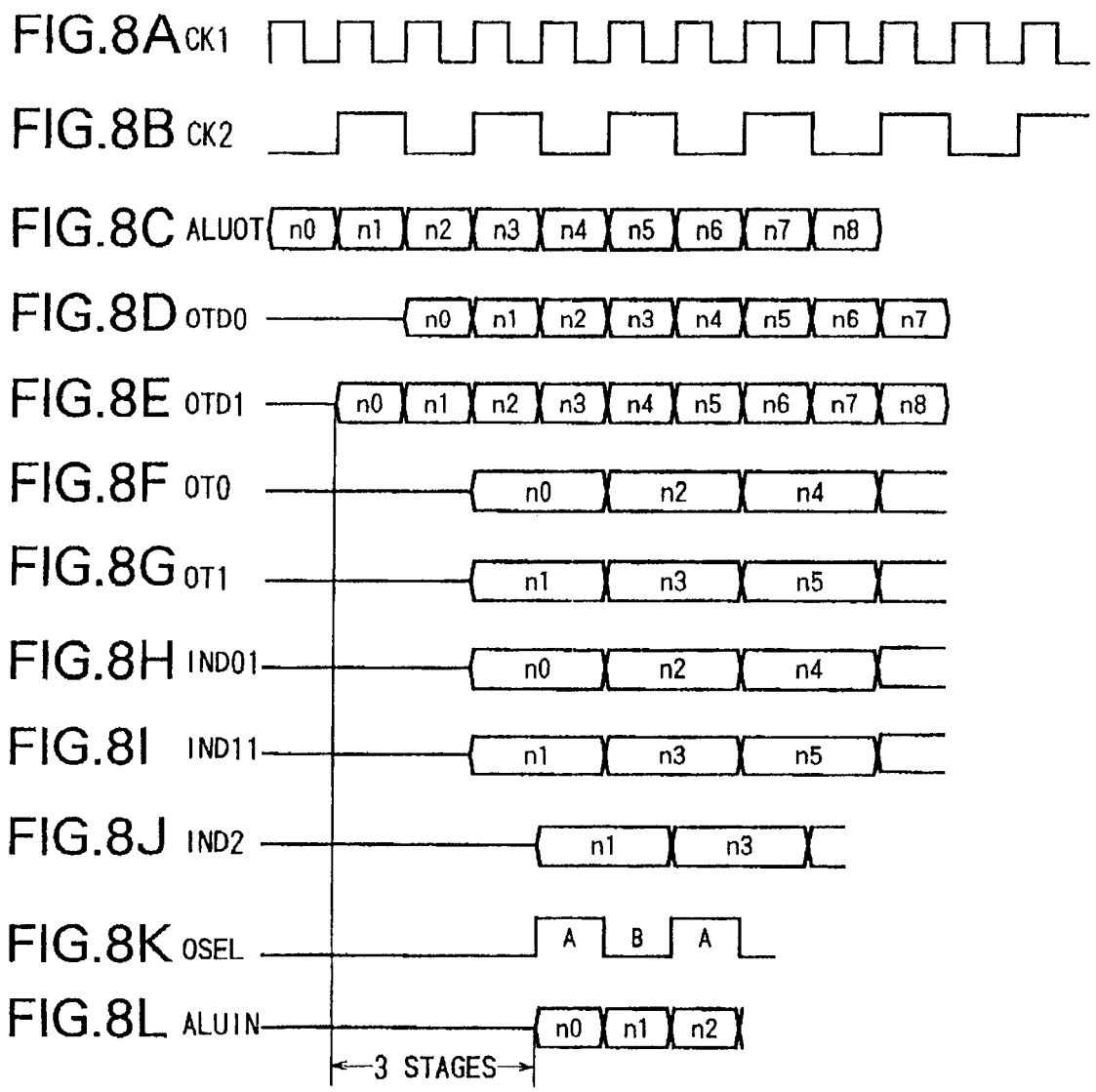

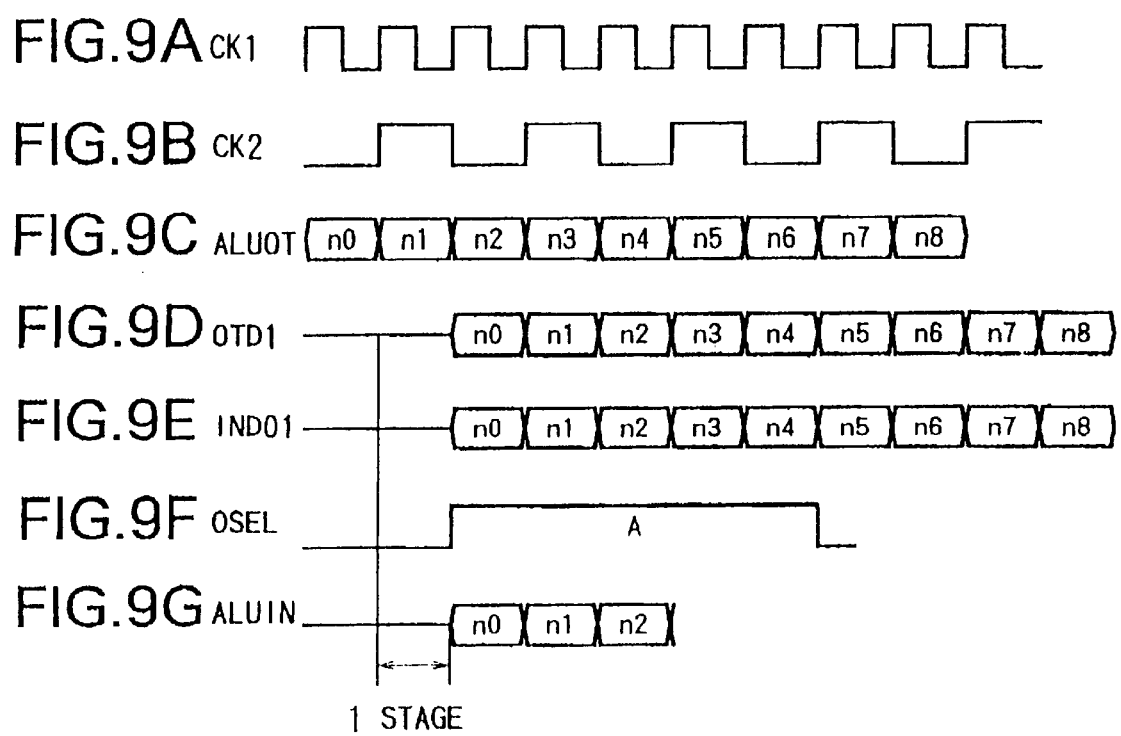

INTER-DEVICE COUPLER

BACKGROUND OF THE INVENTION

1. Field of the Invention

The present invention relates to an inter-device coupler which arbitrates data transfer between devices operating at different speeds, more particularly relates to a coupler of an arithmetic logical unit (ALU) and a memory for a memory closely coupled with an ALU.

2. Description of the Related Art

In a processor as a coupler for closely coupling an ALU and a memory, the write and read speed of the memory often becomes a bottleneck.

Therefore, in the related art, the practice has been to make the operating speed of the ALU twice the memory access speed, provide a coupler between the ALU and memory, perform serial-parallel conversion and parallel-serial conversion, and prevent a fall in the bandwidth even if the access speed of the memory is low.

FIG. 1 is a circuit diagram of an example of the configuration of a coupler of an ALU and a memory of the related art.

The coupler 10 comprises, as shown in FIG. 1, positive-edge D-type flip-flops 11, 12, 13, 14, and 19, memories 15 and 16, negative-edge D-type flip flops 17 and 18, and a two-input one-output selector 20. Reference number 21 indicates the ALU.

In the coupler 10, a clock signal CK1 is supplied to the flip-flops 11, 12, and 19, while a clock signal CK2 is supplied to the flip-flops 13, 14, 17, and 18.

An output signal ALUOT of the ALU 21 is supplied to an input D of the flip-flop 11. An output signal OTD1 from the output Q of the flip-flop 11 is supplied to inputs of the flip-flops 12 and 13, respectively, while an output signal OTD0 from an output Q of the flip-flop 12 is supplied to an input D of the flip-flop 14.

The output signals OT1 and OT0 from the outputs Q from the flip-flops 13 and 14 are respectively supplied to write ports of memories 15 and 16, while read signals IN1 and IN0 from read ports of the memories 15 and 16 are supplied to inputs D of the flip-flops 17 and 18.

An output signal IND0 from an output Q of the flip-flop 18 is supplied to a port A of the selector, an output signal IND1 from an output Q of the flip-flop 17 is supplied to an input D of the flip-flop 19, and an output signal IND2 from an output Q of the flip-flop 19 is supplied to a port B of the selector 20. An output signal from the selector 20 becomes an input signal ALUIN of the ALU 21. A selection signal of the selector 20 is made OSEL.

Assuming that the CK1 is a normal clock signal, the CK2 is a clock obtained by frequency-division of CK1.

The memories 15 and 16 are written into at rising edge of the clock signal CK2 and read from at a trailing edge of the clock signal CK2. It takes three cycles of the clock signal CK1 from the writing to reading due to the nature of the memories.

Next, an operation of the coupler 10 of an ALU and a memory of the related art will be explained with reference to timing charts of FIGS. 2A to 2N.

FIGS. 2A to 2N are timing charts of the case when immediately reading data written in a memory and transferring it to the ALU.

First, as shown in FIG. 2C, data streams n0, n1, n2, n3 . . . are output as a signal ALUOT from the ALU 21.

As shown in FIGS. 2D and 2E, the n0, n1, n2, n3 . . . are output respectively delayed by one cycle and two cycles of the clock signal CK1 from the flip-flops 11 and 12.

At this time, since the phase relationship of the clock signals CK1 and CK2 is set as shown in FIGS. 2A and 2B, outputs from the flip-flops 13 and 14 are delayed by four cycles from the input of n0 to the flip-flop 11.

The data is written in the memories 15 and 16 and sent to the flip-flops 17 and 18 after three cycles.

An output of the flip-flop 17 is delayed exactly by one cycle in the flip-flop 19 and output to the port B of the selector 20.

By changing the selection signal OSEL of the selector 20 by the timing shown in FIG. 2M, data of n0, n1, n2 . . . from the selector 20 is output from the ALU 21.

Summarizing the problem to be solved by the invention, in the coupler 10 of the related art, a delay of 7 cycles was required between writing data of the ALU 11 in a memory and reading it again from the memory.

Accordingly, in the coupler 10 of an ALU and memory of the related art, the delay becomes long when temporarily writing output data from the ALU 21 and using the same immediately after the writing. There is a period when no computations are possible until the read data becomes usable in the ALU 21.

The reason why the delay becomes 7 cycles is that two cycles are needed for changing a clock from CK1 to CK2, three cycles for writing and reading to and from the memory, and two cycles for switching the clock from CK2 to CK1.

One method for solving this problem is to provide more registers inside the ALU, but the connections to the registers become complex, the control circuit also becomes complex, and furthermore the power consumption in the clock system increases because it has to be always operated by the CK1 clock.

SUMMARY OF THE INVENTION

An object of the present invention is to provide an inter-device coupler capable of giving any delay to output data of an ALU and outputting the result as input data of the ALU with a simple configuration and without increasing the power consumption.

To attain the above object, according to a first aspect of the present invention, there is provided an inter-device coupler for arbitrating data transfer between an ALU and a memory operating at different speeds, comprising a first input circuit operating at the same speed as the ALU and receiving as input and outputting output data of the ALU; a second input circuit operating at the same speed as the memory and receiving as input and outputting output data of the first input circuit to the memory; a first output circuit operating at the same speed as the memory and receiving as input and outputting read data of the memory; a second output circuit operating at the same speed as the ALU and outputting input data to the ALU; and a path selector for inputting at least one of the output data of the first input circuit or the output data of the first output circuit to the second output circuit in accordance with a value of a path selection signal.

Preferably, the path selector inputs the output data of the first input circuit, the output data of the second input circuit, or the output data of the first output circuit to the second output circuit in accordance with the value of the path selection signal.

According to a second aspect of the present invention, there is provided an inter-device coupler for arbitrating data transfer between an ALU and a memory operating at different speeds, comprising a first input circuit operating at the same speed as the ALU and receiving as input and outputting output data of the ALU; a second input circuit operating at the same speed as the memory and receiving as input and outputting output data of the first input circuit to the memory; a first output circuit operating at the same speed as the memory and receiving as input and outputting read data of the memory; a selection circuit operating at the same speed as the memory, comprising a first input and a second input, and selecting an input signal for the first input or an input signal for the second input and outputting the same to the ALU in accordance with an output selection signal; a second output circuit operating at the same speed as the ALU and outputting input data to the ALU; and a path selector for inputting at least one of the output data of the first input circuit or the output data of the first output circuit to the first input of the selection circuit or the second output circuit in accordance with a value of a path selection signal.

Preferably, the path selector inputs the output data of the first input circuit, the output data of the second input circuit, or the output data of the first output circuit to the first input of the selection circuit or the second output circuit in accordance with the value of the path selection signal.

According to a third aspect of the present invention, there is provided an inter-device coupler for arbitrating data transfer between apparatuses operating at different speeds, comprising n number (n is an integer of 2 or more) of memories; an ALU operating at a speed n times that of the memories; n number of first input circuits operating at the same speed as the ALU, having cascade connected inputs and outputs, and receiving as input and successively transferring the output data of the ALU; n number of second input circuits operating at the same speed as the memories, provided corresponding to the n number of first input circuits, receiving as input output data of corresponding first input circuits, and outputting the same to corresponding memories; n number of first output circuits operating at the same speed as the memories and receiving as input and outputting read data of corresponding memories; a second output circuit operating at the same speed as the ALU and outputting input data to the ALU; and a path selector for inputting at least one of the output data of the initial said first input circuit or the output data of the n number of first output circuits to the second output circuit in accordance with a value of a path selection signal.

Preferably, the path selection circuit inputs any one of the output data of the initial said first input circuit among the n number of first input circuits, the output data of n number of second input circuits, or the output data of n number of first output circuits input to the second output circuit in accordance with a value of the path selection signal.

According to a fourth aspect of the present invention, there is provided an inter-device coupler for arbitrating data transfer between apparatuses operating at different speeds, comprising n number (n is an integer of 2 or more) of memories; an ALU operating at a speed of n times that of the memories; n number of first input circuits operating at the same speed as the ALU, having cascade-connected inputs and outputs, and receiving as input and successively transferring the output data of the ALU; n number of second input circuits operating at the same speed as the memories, provided corresponding to the n number of first input circuits, receiving as input output data of corresponding first input circuits, and outputting the same to the corresponding memories; n number of first output circuits operating at the same speed as the memories and receiving as input and outputting read data of corresponding memories; a selection circuit operating at the same speed as the ALU, comprising a first input and a second input, and selecting an input signal for the first input or an input signal for the second input and outputting the same to the ALU in accordance with an output selection signal; a second output circuit operating at the same speed as the ALU for outputting input data to the second input of the selection circuit; and a path selector for inputting at least one of the output data of an initial said first input circuit or the output data of the n number of first output circuits to the first input of the selection circuit or the second output circuit in accordance with a value of a path selection signal.

Preferably, the path selector inputs any one of the output data of the initial said first input circuit, the output data of the n number of second input circuits, or the output data of the n number of first output circuits to the first input of the selection circuit or the second output circuit in accordance with a value of a path selection signal.

Alternatively, the path selector gives a delay of a predetermined number of cycles of the memory to the input data and outputs the result to the first input of the selection circuit and the second output circuit in accordance with a value of the path selection signal.

According to the present invention, the output data of an ALU is input to a first input circuit operating at the same speed as the ALU and output to a second input circuit operating at the same speed as the memory and a path selector.

The second input circuit fetches the output data of the first input circuit and outputs it for example to the memory and path selector.

As a result, the data is stored in the memory. Then, the data stored in the memory is read at a predetermined cycle and output to the first output circuit operating at the same speed as the memory.

The first output circuit fetches the data read from the memory and outputs it to the path selector.

The path selector is supplied with a path selection signal and selectively connects one path of data among the output data of the first input circuit, the output data of the second input circuit, and the output data of the first output circuit to a path to an input to the second output circuit in accordance with the value of the signal.

The selected data is input to the second output circuit operating at the same speed of the ALU as it is or delayed by a predetermined number of cycles of the memory and output to the ALU.

Alternatively, when there is a selection circuit, the path selector is supplied with a path selection signal and selectively connects one data path from among the output data of the first input circuit, the output data of the second input circuit, and the output data of the first output circuit to a path to the first input of the selection circuit or the input of the second output circuit in accordance with the value of the signal.

Then, the selected data is input as it is or delayed by a predetermined number of cycles of the memory to the selection circuit directly or via the second output circuit at the same speed as the ALU and output to the ALU.

Alternatively, when the ALU operates at a speed n times that of the memory, the output data of the ALU is input to an initial first input circuit operating at the same speed as the ALU and successively output to later first input circuits.

The input data is output from the initial first input circuit to a corresponding second input circuit operating at the same speed as corresponding memories and the path selector.

Also, the output data of each of the second first input circuit on is respectively output to the corresponding second input circuit operating at the same speed as the memories.

The n number of second input circuits fetch the output data of the corresponding first input circuits and output the same to for example the memories and path selector.

As a result, the data is stored in the memories. Then, the data stored in the n number of memories is read at predetermined cycles and output to the first output circuits operating at the same speed as the memories.

The n number of first output circuits fetch data read from the memories and output the same to the path selector.

The path selector is supplied with a path selection signal and selectively connects one data path among the output data of the initial first input circuit, the output data of n number of second input circuits, and the output data of n number of first output circuits to a path to the input of the second output circuit in accordance with a value of the signal.

Then, the selected data is input delayed by a predetermined number of cycles of the memory to the second output circuit operating at the same speed as the ALU and output to the ALU.

Alternatively, when there is a selection circuit, the path selector is supplied with a path selection signal and selectively connects one data path among the output data of the initial first input circuit, the output data of n number of second input circuits, and the output data of n number of first output circuits to a path to the first input of the selection circuit or the input of the second output circuit in accordance with the value of the path selection signal.

Then, the selected data is input delayed by a predetermined number of cycles of the memory to the selection circuit directly or via the second output circuit at the same speed as the ALU and output to the ALU.

BRIEF DESCRIPTION OF THE DRAWINGS

These and other objects and features of the present invention will become clearer from the following description of the preferred embodiments given with reference to the accompanying drawings, in which:

FIGS. 2A to 2N are views of timing charts when reading data immediately after writing to a memory and transferring the same to an ALU by using the coupler of the related art;

FIG. 3 is a circuit diagram of a first embodiment of a coupler of an ALU and a memory according to the present invention;

FIGS. 6A to 6N are timing charts for explaining an operation of the apparatus in FIG. 3 when a delay is 7;

FIGS. 7A to 7L are timing charts for explaining an operation of the apparatus in FIG. 3 when the delay is 5;

FIGS. 8A to 8L are timing charts for explaining an operation of the apparatus in FIG. 3 when the delay is 3;

FIGS. 9A to 9G are timing charts for explaining an operation of the apparatus in FIG. 3 when the delay is 1.

DESCRIPTION OF THE PREFERRED EMBODIMENTS

Figure 1:
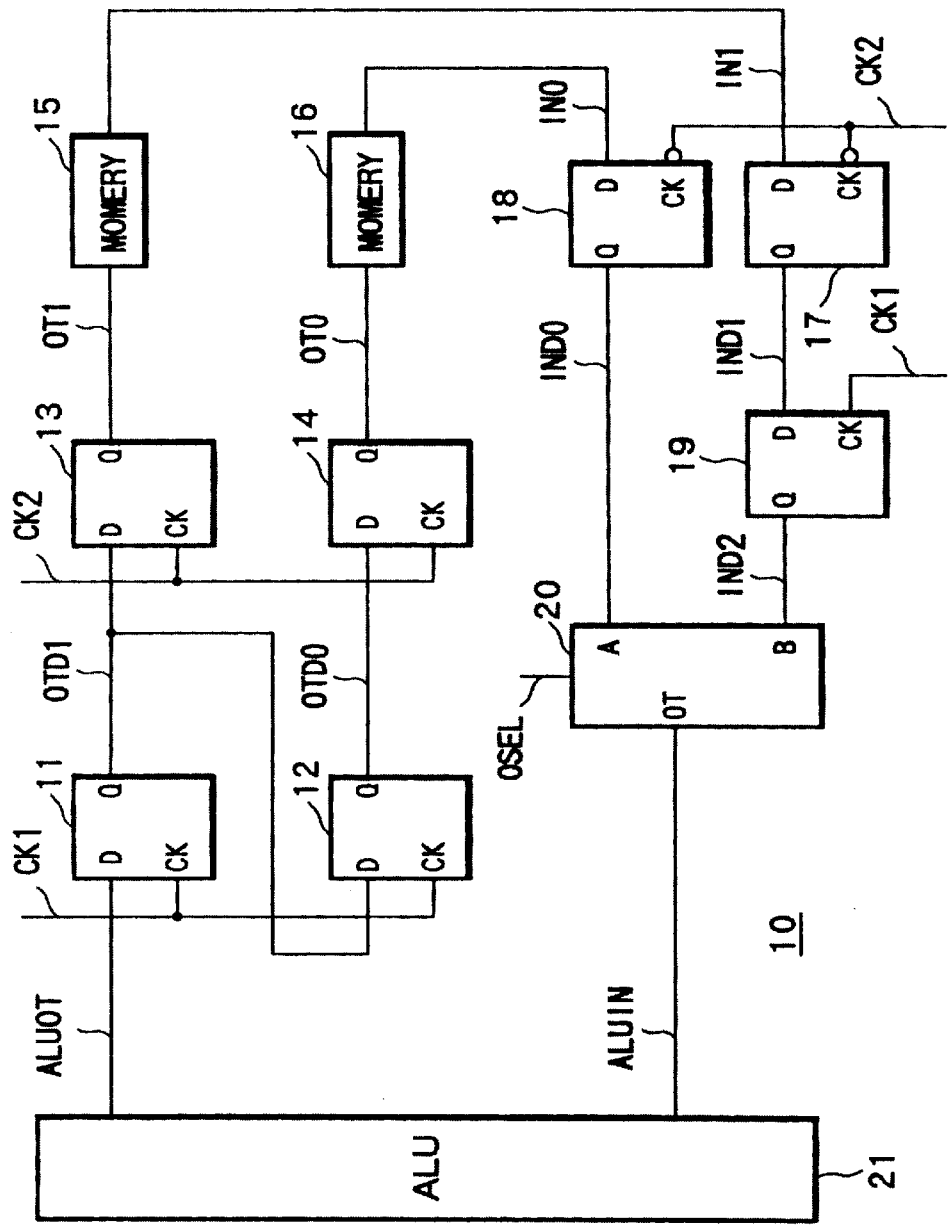
FIG. 1 is a circuit diagram of an example of the configuration of a coupler between an ALU and a memory of the related art.

Below, preferred embodiments will be described with reference to the accompanying drawings.

First Embodiment

FIG. 3 is a circuit diagram of a first embodiment of a coupler of an ALU and a memory according to the present invention.

As shown in FIG. 3, the present coupler 100 comprises positive-edge type flip-flops 101 and 102 as first input circuits, positive-edge type flip-flops 103 and 104 as second input circuits, memories 105 and 106, negative-edge type D-type flip-flops 107 and 108 as first output circuits, a positive-edge type flip-flop 109 as a second output circuit, a two-input one-output selector (selection circuit) 110, and a path selector 111.

In FIG. 3, reference number 112 indicates an ALU (ALU).

The ALU 112 operates at n times the speed of the memories 105 and 106 (n is an integer of 2 or more, specifically 2 in the present invention).

In the coupler 10, the flip-flops 101, 102, and 109 are supplied with a clock signal CK1, while the flip-flops 103, 104, 107, and 108 are supplied with a clock signal CK2.

An output signal ALUOT of the ALU 112 is supplied to an input D of the flip-flop 101. An output signal OTD1 from an output Q of the flip-flop 101 is supplied to inputs D of flip-flop 102 and 103 and an input port OI0 of the path selector 111, while an output signal OTD0 from an output Q of the flip-flop 102 is supplied to an input D of the flip-flop 104.

Output signals OT1 and OT0 from outputs Q of the flip-flops 103 and 104 are respectively supplied to write ports of the memories 105 and 106 and input ports OI1 and OI2 of the path selector 111, while signals IN1 and IN0 read from read ports of the memories 105 and 106 are respectively supplied to inputs D of the flip-flops 107 and 108.

An output signal IND1 from an output Q of the flip-flop 107 is supplied to an input port EI3 of the path selector 11, while an output signal IND0 from an output Q of the flip-flop 108 is supplied to an input port EI2 of the path selector 111.

An output signal IND01 from an output port EO2 of the path selector 111 is supplied to a port A (a first input) of the selector 110, while an output signal IND11 from an output port EO3 is supplied to an input D of the flip-flop 109.

An output signal IND2 from an output Q of the flip-flop 109 is supplied to a port B (a second input) of the selector 110.

An output signal from the selector 110 becomes an input signal ALUIN of the ALU 112. A selection signal of the selector 110 is made OSEL.

Also, the selector 110 operates in synchronization with the clock signal CK1. Namely, the selector 110 operates at the same speed as the ALU 112.

When considering the CK1 as a normal clock signal, CK2 is a clock obtained by frequency-division of CK1.

The memories 105 and 106 are written at a rising edge of the clock signal CK2 and read at a trailing edge of the clock signal CK2. It takes three cycles of the clock signal CK1 from writing to reading due to the nature of the memories.

Figures 4, 5:
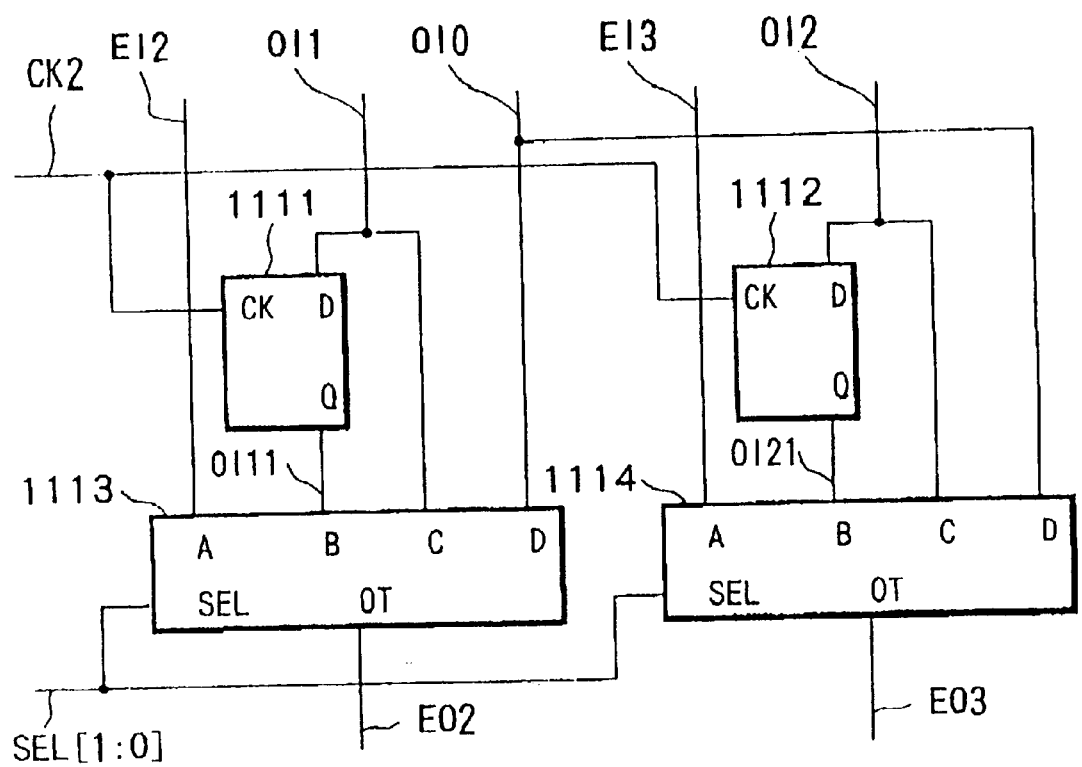
FIG. 4 is a view of the relationship between a selection signal and a path in a path selector according to the present invention.
FIG. 5 is a circuit diagram of a specific example of the configuration of a path selector according to the present invention.

Also, the path selector 111 sets a path to EO2 and EO3 based on a path correspondence table shown in FIG. 4 using the selection signal SEL[1:0] so as to give any delay of 1, 3, 5, and 7 cycles.

Specifically, the path selector 111 is supplied with a selection signal SEL[1:0] of "00" when a delay of 7 is required and connects an input port EI3 to an output port EO3 and an input port EI2 to an output port EO2.

The path selector 111 is supplied with a selection signal SEL[1:0] of "01" when a delay of 5 is required and connects the input port OI1 to the output port EO2 and the input port OI2 to an output port EO3 by respectively inserting two units of delay.

The path selector 111 is supplied with a selection signal SEL[1:0] of "10" when a delay of 3 is required and connects the input port OI1 to the output port EO2 and the input port OI2 to the output port EO3.

Furthermore, the path selector 111 is supplied with a selection signal SEL[1:0] of "11" when a delay of 1 is required and connects the input port OI0 to the output ports EO2 and EO3.

FIG. 5 is a circuit diagram of a specific example of the configuration of the path selection circuit according to the present invention.

As shown in FIG. 5, the path selection circuit 111 comprises D-type flip-flops 1111 and 1112 and 4-input 1-output selectors 1113 and 1114.

The clock signal CK2 is supplied as a clock signal to the flip-flops 1111 and 1112.

The data input to the selector 1111 is the output signal IND0 of the flip-flop 108 input via the input port EI2, the output data OI11 of the flip-flop 1111, the output signal OT0 of the flip-flop 104 input via the input port OI1, and the output signal OTD1 of the flip-flop 101 input via the input port OI0.

The data input to the flip-flop 1111 is the output signal OT0 of the flip-flop 104 input via the input port OI1.

Furthermore, the data input to the selector 1112 is the output signal IND1 of the flip-flop 107 input via the input port EI3, the output data OI21 of the flip-flop 1112, the output signal OT1 of the flip-flop 103 input via the input port OI2, and the output signal OTD1 of the flip-flop 101 input via the input port OI0.

The data input to the flip-flop 1112 is the output signal OT1 of the flip-flop 103 input via the input port OI2.

The selection signal of the selectors 1113 and 1114 is SEL[1:0]. The selectors 1113 and 1114 receive data input via a connection path of any of the input ports A, B, C, and D and an output port OT selected in accordance with a value of the selection signal SEL[1:0] and output the data from the output ports EO2 and EO3.

Next, the operations by the above configuration when the delay is 7, 5, 3, and 1 will be explained with reference to the timing charts of FIGS. 6A to 6N to FIGS. 9A to 9G.

First, an operation when the delay is 7 will be explained with reference to FIGS. 6A to 6N.

In this case, as shown in FIG. 6C, data streams n0, n1, n2, n3 . . . are output as a signal ALUOT from the ALU 112.

As shown in FIGS. 6D and 6E, n0, n1, n2, n3 . . . are output from the flip-flops 101 and 102 as signals OTD1 and OTD0 delayed by 1 cycle and 2 cycles of the clock signal CK1, respectively.

At this time, the phase relationship of the clock signals CK1 and CK2 is set as shown in FIGS. 6A and 6B, thus the output signals OT1 and OT0 from the flip-flops 103 and 104 are output after four cycles from input of the n0 to the flip-flop 101.

The data is written in the memories 105 and 106 and sent to the flip-flops 107 and 108 after 3 cycles of the clock signal CK1.

When realizing a delay of 7, the selection signal SEL[1:0] from for example a not illustrated control circuit is set to "00" and supplied to the path selector 111.

As a result, the path selector 11 forms a path from the input port EI2 to the output port EO2 and a path from the input port EI3 to the output port EO3.

Accordingly, the output signal IND1 of the flip-flop 107 is supplied as a signal IND11 to the flip-flop 109 through the path from the input port EI3 to the output port EO3 of the path selection circuit 111 and output to the port B of the selector 110 delayed by 1 cycle in the flip-flop 109.

Also, the output signal IND0 of the flip-flop 108 is output as a signal IND01 to the port A of the selector 110 through the path from the input port EI2 to the output port EO2 of the path selector 111.

Then, the selection signal OSEL of the selector 110 is changed at a timing shown in FIG. 6M and the data n0, n1, n2 . . . is output as a signal ALUIN from the selector 110 delayed by 7 cycles from the input of the signal ALUOT.

Next, the operation when the delay is 5 will be explained with reference to FIGS. 7A to 7L.

In this case, as shown in FIG. 7C, the data streams n0, n1, n2, n3 . . . are output as a signal ALUOT from the ALU 112.

n0, n1, n2, n3 . . . are output from the flip-flops 101 and 102 as output signals OTD1 and OTD0 delayed by 1 cycle and 2 cycles of the clock signal CK1 respectively as shown in FIGS. 7D and 7E.

At this time, since the phase relationship of the clock signals CK1 and CK2 is set as shown in FIGS. 7A and 7B, the output signals OT1 and OT0 from the flip-flops 103 and 104 are output after 4 cycles of the clock signal CK1 from input of the n0 to the flip-flop 101 as shown in FIGS. 7F and 7G.

Then, when realizing a delay of 5, the selection signal SEL[1:0] from a not shown control circuit is set to "01" and supplied to the path selector 111.

As a result, the path selector 111 forms a path from the input port OI1 to the output port EO2 via the flip-flop in the path selector 111 and a path from the input port OI2 to the output port EO3 via the flip-flop in the path selector 111. As a result, the delay in the path selector 111 becomes 2 cycles.

The output signal IND01 from the output port EO2 of the path selector 111 is output to the port A of the selector 110, while the output signal IND11 from the output port EO3 is input to the port B of the selector 110 delayed by 1 cycle in the flip-flop 109.

The selection signal OSEL of the selector 110 is changed by the timing shown in FIG. 7K and data n0, n1, n2, n3 . . . is output as a signal ALUIN from the selector 110 delayed by 5 cycles from the input of the signal ALUOT.

Next, the operation when the delay is 3 will be explained with reference to FIGS. 8A to 8L.

In this case, as shown in FIG. 8C, data streams n0, n1, n2, n3 . . . are output as a signal ALUOT from the ALU 112.

n0, n1, n2, n3 . . . are output from the flip-flops 101 and 102 as output signals OTD1 and OTD0 delayed by 1 cycle and 2 cycles of the clock signal CK1 respectively as shown in FIGS. 8D and 8E.

At this time, since the phase relationship of the clock signals CK1 and CK2 is set as shown in FIGS. 8A and 8B, the output signals OT1 and OT0 from the flip-flops 103 and 104 are output after 4 cycles of the clock signal CK1 from input of the n0 to the flip-flop 101 as shown in FIGS. 8F and 8G.

Then, when realizing a delay of 3, the selection signal SEL[1:0] from a not shown control circuit is set to "10" and supplied to the path selector 111.

As a result, the path selector 111 forms a path from the input port OI1 to the output port EO2 and a path from the input port OI2 to the output port EO3.

The output signal IND01 from the output port EO2 of the path selector 111 is output to the port A of the selector 110, while the output signal IND11 from the output port EO3 is input to the port B of the selector 110 delayed by 1 cycle in the flip-flop 109.

The selection signal OSEL of the selector 110 is changed by the timing shown in FIG. 8K and data n0, n1, n2, n3 . . . is output as a signal ALUIN from the selector 110 delayed by 3 cycles from the input of the signal ALUOT.

Next, the operation when the delay is 1 will be explained with reference to FIGS. 9A to 9G.

In this case, as shown in FIG. 9C, data streams n0, n1, n2, n3 . . . are output as a signal ALUOT from the ALU 112.

n0, n1, n2, n3 . . . are output from the flip-flop 101 as an output signal OTD1 delayed by 1 cycle of the clock signal CK1 as shown in FIG. 9D.

When realizing a delay of 1, the selection signal SEL[1:0] from a not shown control circuit is set to "11" and supplied to the path selector 111.

As a result, the path selector 111 forms a path from the input port OI1 to the output ports EO2 and EO3.

The output signal IND01 from the output port EO2 of the path selector 111 is output to the port A of the selector 110, while the output signal IND11 from the output port EO3 is input to the port B of the selector 110 delayed by 1 cycle in the flip-flop 109.

The selection signal OSEL of the selector 110 is changed by the timing shown in FIG. 9F and data n0, n1, n2, n3 . . . is output as a signal ALUIN from the selector 110 delayed by 3 cycles from the input of the signal ALUOT.

As explained above, according to the first embodiment, since the path selector 111 for setting a path for generating a delay of 1, 3, 5 or 7 cycles in accordance with the value of the selection signal SEL[1:0] is provided between the outputs of the flip-flops 101 to 104 on the input side of the coupler and the input of the flip-flop 109 on the output side, it becomes possible to generate any of a delay of 1, 3, 5, or 7 from output of data by the ALU 112 to input of the data to the ALU 112.

As a result, the problem of a coupler of an ALU and a memory of the related art that when temporarily writing output data of the ALU in the memory and using the same immediately after that, the delay becomes large and overhead occurs in computations of the ALU can be solved.

Further, depending on the application, a delay larger than "0" is sometimes required for performing another computation during a write operation to the memory, but such a case can be easily handled by changing the selection signal.

Despite this function, it is possible to keep down the increase of the circuit size by using existing flip-flops.

Second Embodiment

Figure 10:
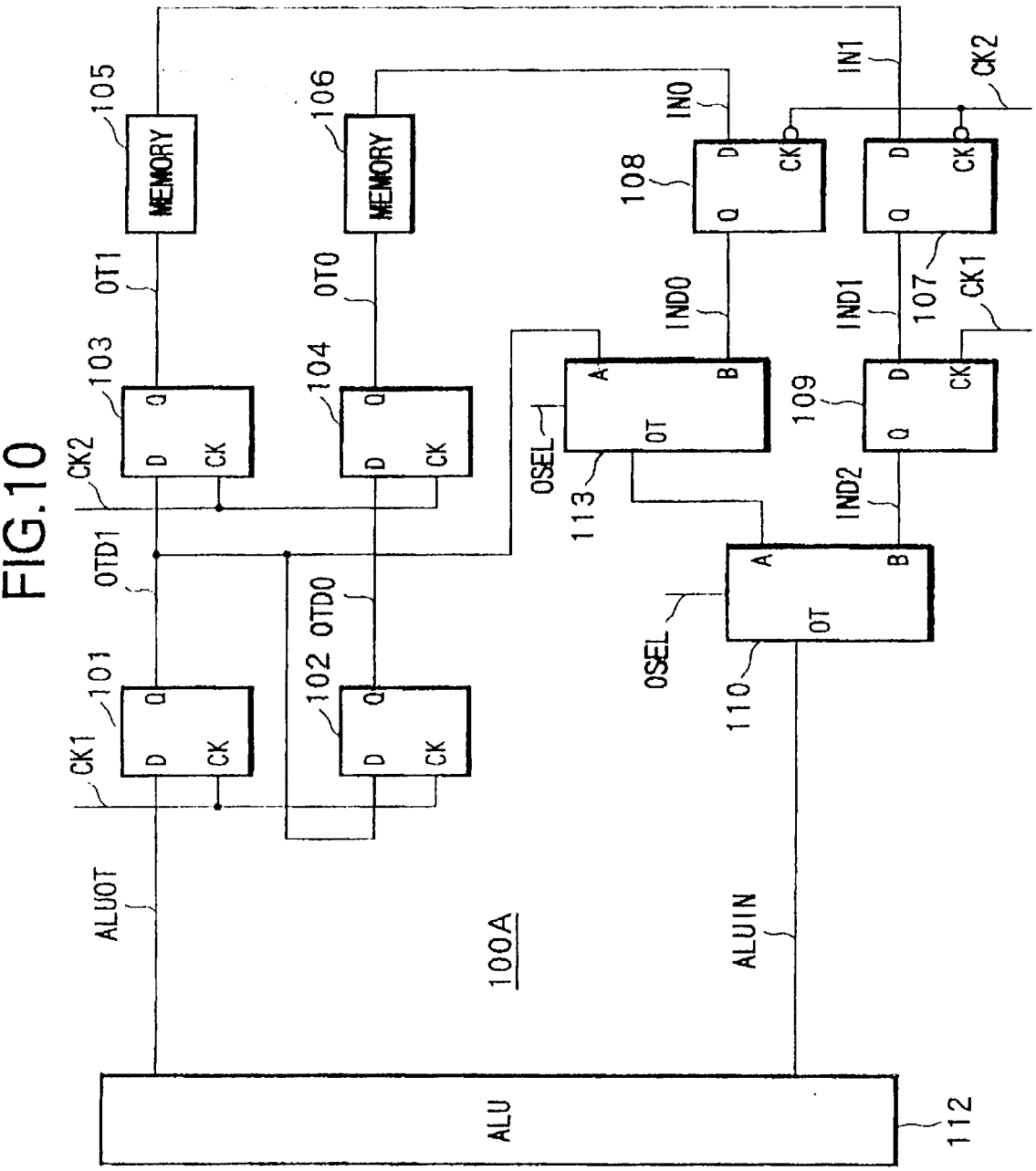
FIG. 10 is a circuit diagram of a second embodiment of a coupler of an ALU and a memory according to the present invention.

FIG. 10 is a circuit diagram of a second embodiment of a coupler of an ALU and memory according to the present invention.

The difference of the second embodiment from the above first embodiment is that the path selector is made to select the output signal OTD1 of the flip-flop 101 or the output signal IND0 of the flip-flop 108 on the input side in accordance with the selection signal SEL and to output the same to the port A of the selector 110.

While it is not possible to set any value of delay, the second embodiment is preferable in some applications in which no other computation is performed during a write operation to a memory and a delay of more than "0" is not necessary.

Summarizing the effects of the invention, according to the present invention, it is possible to generate any desired delay.

Therefore, the problem that when temporarily writing output data of the ALU in the memory and using the same immediately after that, the delay becomes large and overhead occurs in computations of the ALU can be solved.

Further, depending on the application, a delay larger than "0" is sometimes required for performing another computation during a write operation to the memory. Such a case can be easily handled by changing the selection signal.

Despite this function, it is possible to keep down the increase of the circuit size by using existing flip-flops.

Note that the present invention is not limited to the above embodiments and includes modifications within the scope of the claims.

What is claimed is:

1. An inter-device coupler for arbitrating data transfer between an arithmetic logical unit and a memory operating at different speeds, comprising:
    a first input circuit operating at the same speed as said arithmetic logical unit and receiving as input and outputting output data of said arithmetic logical unit;
    a second input circuit operating at the same speed as said memory and receiving as input and outputting output data of said first input circuit to said memory;
    a first output circuit operating at the same speed as said memory and receiving as input and outputting read data of the memory;
    a second output circuit operating at the same speed as said arithmetic logical unit and outputting input data to said arithmetic logical unit; and
    a path selector for inputting at least one of the output data of said first input circuit or the output data of said first output circuit to said second output circuit in accordance with a value of a path selection signal.

2. An inter-device coupler as set forth in claim 1, wherein said path selector inputs the output data of said first input circuit, the output data of said second input circuit, or the output data of said first output circuit to said second output circuit in accordance with the value of the path selection signal.

3. An inter-device coupler as set forth in claim 2, wherein said path selector gives a delay of a predetermined number of cycles of said memory to the input data and outputs the result to said second output circuit in accordance with the value of said path selection signal.

4. An inter-device coupler as set forth in claim 1, wherein said path selector gives a delay of a predetermined number of cycles of said memory to the input data and outputs the result to said second output circuit in accordance with the value of said path selection signal.

5. An inter-device coupler for arbitrating data transfer between an arithmetic logical unit and a memory operating at different speeds, comprising:

a first input circuit operating at the same speed as said arithmetic logical unit and receiving as input and outputting output data of said arithmetic logical unit;

a second input circuit operating at the same speed as said memory and receiving as input and outputting output data of said first input circuit to said memory;

a first output circuit operating at the same speed as said memory and receiving as input and outputting read data of the memory;

a selection circuit operating at the same speed as said arithmetic logical unit, comprising a first input and a second input, and selecting an input signal for said first input or an input signal for said second input and outputting the selected input signal to said arithmetic logical unit in accordance with an output selection signal;

a second output circuit operating at the same speed as said arithmetic logical unit and outputting input data to said arithmetic logical unit; and a path selector for inputting at least one of the output data of said first input circuit or the output data of said first output circuit to the first input of said selection circuit or said second output circuit in accordance with a value of a path selection signal.

6. An inter-device coupler as set forth in claim 5, wherein said path selector inputs the output data of said first input circuit, the output data of said second input circuit, or the output data of said first output circuit to the first input of said selection circuit or said second output circuit in accordance with the value of the path selection signal.

7. An inter-device coupler as set forth in claim 6, wherein said path selector gives a delay of a predetermined number of cycles of said memory to the input data and outputs the result to the first input of said selection circuit or said second output circuit.

8. An inter-device coupler as set forth in claim 5, wherein said path selector gives a delay of a predetermined number of cycles of said memory to the input data and outputs the result to the first input of said selection circuit or said second output circuit.

9. An inter-device coupler for arbitrating data transfer between apparatuses operating at different speeds, comprising:

n number (n is an integer of 2 or more) of memories;

an arithmetic logical unit operating at a speed n times that of the memories;

n number of first input circuits operating at the same speed as said arithmetic logical unit, having cascade connected inputs and outputs, and receiving as input and successively transferring the output data of said arithmetic logical unit;

n number of second input circuits operating at the same speed as said memories, provided corresponding to said n number of first input circuits, receiving as input output data of corresponding first input circuits, and outputting the same to corresponding memories;

n number of first output circuits operating at the same speed as said memories and receiving as input and outputting read data of corresponding memories;

a second output circuit operating at the same speed as said arithmetic logical unit and outputting input data to said arithmetic logical unit; and a path selector for inputting at least one of the output data of an initial first input circuit or the output data of said n number of first output circuits to said second output circuit in accordance with a value of a path selection signal.

10. An inter-device coupler as set forth in claim 9, wherein said path selection circuit inputs any one of the output data of the initial said first input circuit among said n number of first input circuits, the output data of n number of second input circuits, or the output data of n number of first output circuits input to said second output circuit in accordance with a value of the path selection signal.

11. An inter-device coupler as set forth in claim 10, wherein said path selector gives a delay of a predetermined number of cycles of said memory to the input data and outputs the result to said second output circuit in accordance with a value of said path selection signal.

12. An inter-device coupler as set forth in claim 9, wherein said path selector gives a delay of a predetermined number of cycles of said memory to the input data and outputs the result to said second output circuit in accordance with a value of said path selection signal.

13. An inter-device coupler for arbitrating data transfer between apparatuses operating at different speeds, comprising:

n number (n is an integer of 2 or more) of memories;

an arithmetic logical unit operating at a speed of n times that of said memories;

n number of first input circuits operating at the same speed as said arithmetic logical unit, having cascade-connected inputs and outputs, and receiving as input and successively transferring the output data of said arithmetic logical unit;

n number of second input circuits operating at the same speed as said memories, provided corresponding to said n number of first input circuits, receiving as input output data of corresponding first input circuits, and outputting the same to said corresponding memories;

n number of first output circuits operating at the same speed as said memories and receiving as input and outputting read data of corresponding memories;

a selection circuit operating at the same speed as said arithmetic logical unit, comprising a first input and a second input, and selecting an input signal for said first input or an input signal for said second input and outputting the selected input signal to said arithmetic logical unit in accordance with an output selection signal;

a second output circuit operating at the same speed as said arithmetic logical unit for outputting input data to the second input of said selection circuit; and a path selector for inputting at least one of the output data of an initial said first input circuit or the output data of said n number of first output circuits to the first input of said selection circuit or said second output circuit in accordance with a value of a path selection signal.

14. An inter-device coupler as set forth in claim 13, wherein said path selector inputs any one of the output data of the initial said first input circuit, the output data of said n number of second input circuits, or the output data of said n number of first output circuits to the first input of said selection circuit or said second output circuit in accordance with a value of a path selection signal.

15. An inter-device coupler as set forth as set froth in claim 14, wherein said path selector gives a delay of a predetermined number of cycles of said memory to the input data and outputs the result to the first input of said selection circuit and said second output circuit in accordance with a value of said path selection signal.

16. An inter-device coupler as set forth in claim 13, wherein said path selector gives a delay of a predetermined number of cycles of said memory to the input data and outputs the result to the first input of said selection circuit and said second output circuit in accordance with a value of said path selection signal.

* * * * *